Sept. 15, 1925.

L. ONGSTAD

FLYTRAP

Filed Oct. 27, 1924

1,554,124

Levie Ongstad
INVENTOR

BY Victor J. Evans
ATTORNEY

WITNESS:

Patented Sept. 15, 1925.

1,554,124

UNITED STATES PATENT OFFICE.

LEVIE ONGSTAD, OF BEMIDJI, MINNESOTA.

FLYTRAP.

Application filed October 27, 1924. Serial No. 746,181.

*To all whom it may concern:*

Be it known that I, LEVIE ONGSTAD, a citizen of the United States, residing at Bemidji, in the county of Beltrami, and State of Minnesota, have invented new and useful Improvements in Flytraps, of which the following is a specification.

This invention contemplates the provision of a fly trap which can be set upon a table or any other suitable support, and designed to prevent the escape of the flies that enter the trap, the latter being made up of comparatively few parts which can be readily taken apart to facilitate cleaning thereof, so that the trap can be maintained in a sanitary condition.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
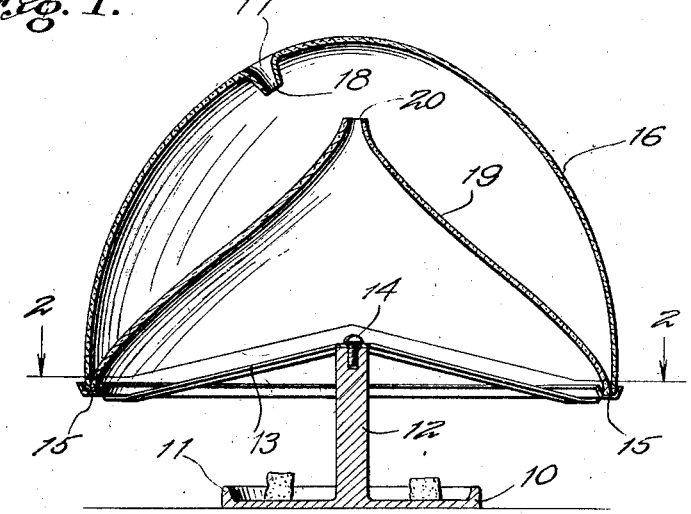
Figure 1 is a vertical sectional view through the trap.
Figure 2:
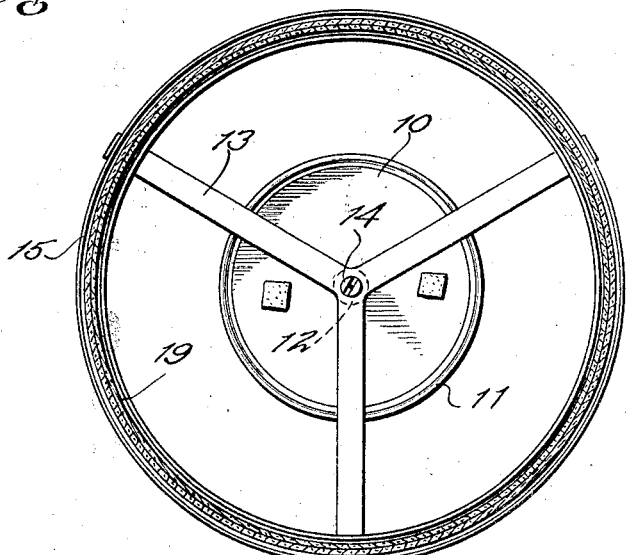
Figure 2 is a sectional view taken on the line 2—2 of Figure 1.

Referring to the drawing in detail, 10 represents a base from which rises a shallow wall 11, the base being designed to be utilized as a bait holder in the manner clearly shown in Figure 1. Rising centrally from this base is a standard 12, and radiating from the upper end of the standard is a plurality of arms 13. These arms are connected together and repose upon the upper end of the standard 12 being secured thereto by means of a suitable fastening element 14. It will be noted upon inspection of Figure 1 that the arms 13 extend downwardly and outwardly from the standard 12, and support a rim like member 15 of channel like formation in cross section. This rim includes a dome 16 which may be constructed from any suitable transparent material, preferably glass, and which dome has an opening 17 through which flies and other insects are allowed to enter the dome. This opening is defined by frusto-conical shaped extension 18 which projects inwardly from a point adjacent the center of the dome. Arranged within the dome and also supported by the rim 15 is an inverted cone shaped member 19 having a frustrated mouth portion, which prevents the escape of insects after they enter the dome either through the mouth portion 20 or the opening 17 above referred to.

The invention provides a trap having an artistic appearance, and one that can be conveniently moved from place to place and arranged upon a table or other suitable support. The flies or other insects may enter the dome 16 either through the opening 17, or by passing upwardly into the member 19, and thence through the restricted opening 20 thereof into the dome. They cannot escape after entering the dome, and by reason of the fact that the dome is constructed of transparent material, the trap is lighted to attract the insects. Furthermore, the dome 16 as well as the conical shaped member 19 can be conveniently separated after being lifted off the rim 15 so that either or both of these members can be conveniently cleaned when desired.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A trap of the character described comprising a base, a standard rising therefrom, arms projecting laterally from the upper end of said standards, a rim connected with said arms and having a channel formation in cross section, a dome supported by said rim, said dome having an opening, a frusto-conical shaped extension projecting inwardly from said opening, and an inverted cone shaped member arranged within the dome and also supported by said rim.

In testimony whereof I affix my signature.

LEVIE ONGSTAD.